United States Patent
Høyvik et al.

Patent Number: 5,603,832
Date of Patent: Feb. 18, 1997

[54] METHOD FOR REMOVING HYDROGEN SULPHIDE FROM OIL-CONTAINING WATER AND EQUIPMENT THEREFOR

[75] Inventors: Henrik Høyvik, Skien; Jan P. Eskilt, Eidanger; Jon Hovland, Skien, all of Norway

[73] Assignee: Norsk Hydro a.s., Oslo, Norway

[21] Appl. No.: 464,892

[22] PCT Filed: Oct. 27, 1993

[86] PCT No.: PCT/NO93/00158

§ 371 Date: Aug. 4, 1995

§ 102(e) Date: Aug. 4, 1995

[87] PCT Pub. No.: WO94/15878

PCT Pub. Date: Jul. 21, 1994

[30] Foreign Application Priority Data

Dec. 30, 1992 [NO] Norway ................. 925061

[51] Int. Cl.$^6$ ............................................. C02F 1/72
[52] U.S. Cl. .................... 210/610; 210/614; 210/617; 210/631; 210/916; 208/236
[58] Field of Search ................... 210/610, 614, 210/616, 617, 631, 916; 208/236

[56] References Cited

U.S. PATENT DOCUMENTS

| | | | |
|---|---|---|---|
| 3,919,402 | 11/1975 | Guth et al. | 210/236 |
| 4,746,434 | 5/1988 | Grieves et al. | 210/631 |
| 4,880,542 | 11/1989 | Sublette | 210/617 |
| 4,911,843 | 3/1990 | Hunniford et al. | 210/610 |
| 4,983,297 | 1/1991 | Kaczmarek et al. | 210/631 |
| 5,114,587 | 5/1992 | Hägerstedt | 210/631 |
| 5,356,458 | 10/1994 | Jayadi et al. | 210/916 |
| 5,366,633 | 11/1994 | Buisman | 210/614 |
| 5,387,344 | 2/1995 | McCombs et al. | 210/617 |
| 5,449,460 | 9/1995 | Buisman | 210/614 |

OTHER PUBLICATIONS

Henshaw, "Biological Removal Of Hydrogen Sulfide From Refinery Wastewater And Conversion To Elemental Sulfur", File 35:Dissertation Abstracts Online 1861–1994/Apr., University of Windsor, Canada, vol. 30/03 of Masters Abstracts, p. 821.

Primary Examiner—Thomas M. Lithgow
Assistant Examiner—Theodore M. Green
Attorney, Agent, or Firm—Wenderoth, Lind & Ponack

[57] ABSTRACT

The invention relates to a method for removing hydrogen sulphide ($H_2S$) from oil-containing water and equipment therefor. Oil-containing water and nitrate is conducted through a bioreactor to remove $H_2S$. Nitrate is added to the oil-containing water in a dose ratio (sulphide:nitrate) of 1:10 to 1:40. The retention time in the reactor tank is 10–60 minutes. After this treatment, purified water where >90% of the $H_2S$-amount is removed are taken out of the tank. The equipment for performing the method is based on a bioreactor having a large density of denitrifying bacteria. The reactor tank 1 is filled with carrying material providing large contact area. Even distribution of oil-containing water and nitrate over the carrying material which already may be covered by septic mud, forms an active sulphide oxidizing biofilm having a large surface. This biofilm is extremely effective for removing sulphide from oil-containing water.

3 Claims, 3 Drawing Sheets

METHOD FOR REMOVING HYDROGEN SULPHIDE FROM OIL-CONTAINING WATER AND EQUIPMENT THEREFOR

BACKGROUND OF THE INVENTION

The present invention relates to a method for removing hydrogen sulphide from oil-containing water and equipment therefor.

Oil-containing water like ballast water and contaminated water co-produced with petroleum, may when stored in absence of oxygen cause odour problems in the form of hydrogen sulphide ($H_2S$) and mercaptans.

$H_2S$ is produced by sulphate reducing bacteria:

$$\text{Organic matter} + SO_4^{2-} \rightarrow CO_2 + H_2O + H_2S + \text{organic acids}.$$

Organic matter like oil, is broken down to simple organic compounds that are used by the sulphate reducing bacteria according to the equation. Sulphate is present in sea water. Also other sulphur compounds might cause production of hydrogen sulphide.

A method to eliminate the product ion of sulphur-containing components and/or remove such components from the water phase is to add air or oxygen. In this way already formed sulphide will oxidize, and further growth of the sulphate reducing bacteria will be prevented when aerobic conditions appear. However, this method has several drawbacks. That is the solubility of oxygen which is relatively low in water and the comminutation of oxygen which might be a problem. Air pockets do easily occur, and gases that may release from the water phase may form explosive mixtures together with air. Additionally, it might be easier for the $H_2S$ to leave the waiter phase, and this will make the situation even worse.

Further, addition of hydrogen peroxide will oxidize $H_2S$ and other sulphur compounds. This method is unfavourable in the way that the reaction time is long (3–5 hours), at pH <8.5 solid sulphur will precipitate, there will be an explosion hazard, and as hydrogen peroxide is a very reactive compound, side reactions might easily occur if there is any impurities present. Because of this, stringent demands regarding cleaning and security must prevail. Fulfilling such demands will increase the working costs.

Still another method to reduce the $H_2S$ content, is to add iron ($Fe^{2+}$) to the oil-containing water. During this addition, $H_2S$ will precipitate as solid iron sulphide (FeS). However, sludge in the form of FeS, will cause problems, and additionally the pH will be lowered. Mercaptans will not precipitate.

In U.S. Pat. No. 4,911,843 a process to prevent formation of hydrogen sulphide in waste water and also to remove dissolved hydrogen sulphide from waste systems by adding nitrate ions described. In this process however, the nitrate is added directly into the pipeline. In this way there will not be any controlled formation of a biofilm, and the biofilm which may occur by chance on the walls of the pipeline will not be very effective because of its relatively small surface. When treating waste water like sewer water, the main objection is to prevent formation of sulphide, and this problem is solved by adding nitrate at the start of the pipeline. However, this method will not solve the sulphide problems in oil-containing water in a satisfactory way, as such a medium already contains sulphide.

Also other patents prior to U.S. Pat. No. 4,911,843 describe addition of nitrates or nitrites to sewage in order to reduce hydrogen sulphide and/or control objectionable odours. (See for example U.S. Pat. Nos. 3,300,404, 3,966,450, 4,108,771, 4,446,031 and 4,681,687.)

SUMMARY OF THE INVENTION

It is an object of the present invention to provide a method for eliminating emission of hydrogen sulphide and other sulphur compounds from oil-containing water, which is not burdened with the above mentioned drawbacks.

Another object of the invention is to provide a suitable equipment for performing the method.

The method according to the invention is based on an active biofilm in a reactor tank. Sulphide-containing water and nitrate are continuously supplied to the reactor tank, and after remaining in the reactor tank for some time, purified water where >90% of the $H_2S$-amount is removed, are taken out of the tank.

The equipment according to the invention comprises a bioreactor, where the reactor tank is provided with an inlet and outlet, and is filled with a carrying material covered by an active biofilm.

1: the reactor tank,
2: the inlet,
3: the outlet for treated water,
4: the gas outlet,
5: the nitrate source,
6: the analyzer, and
7: the controller.

Figure 1:
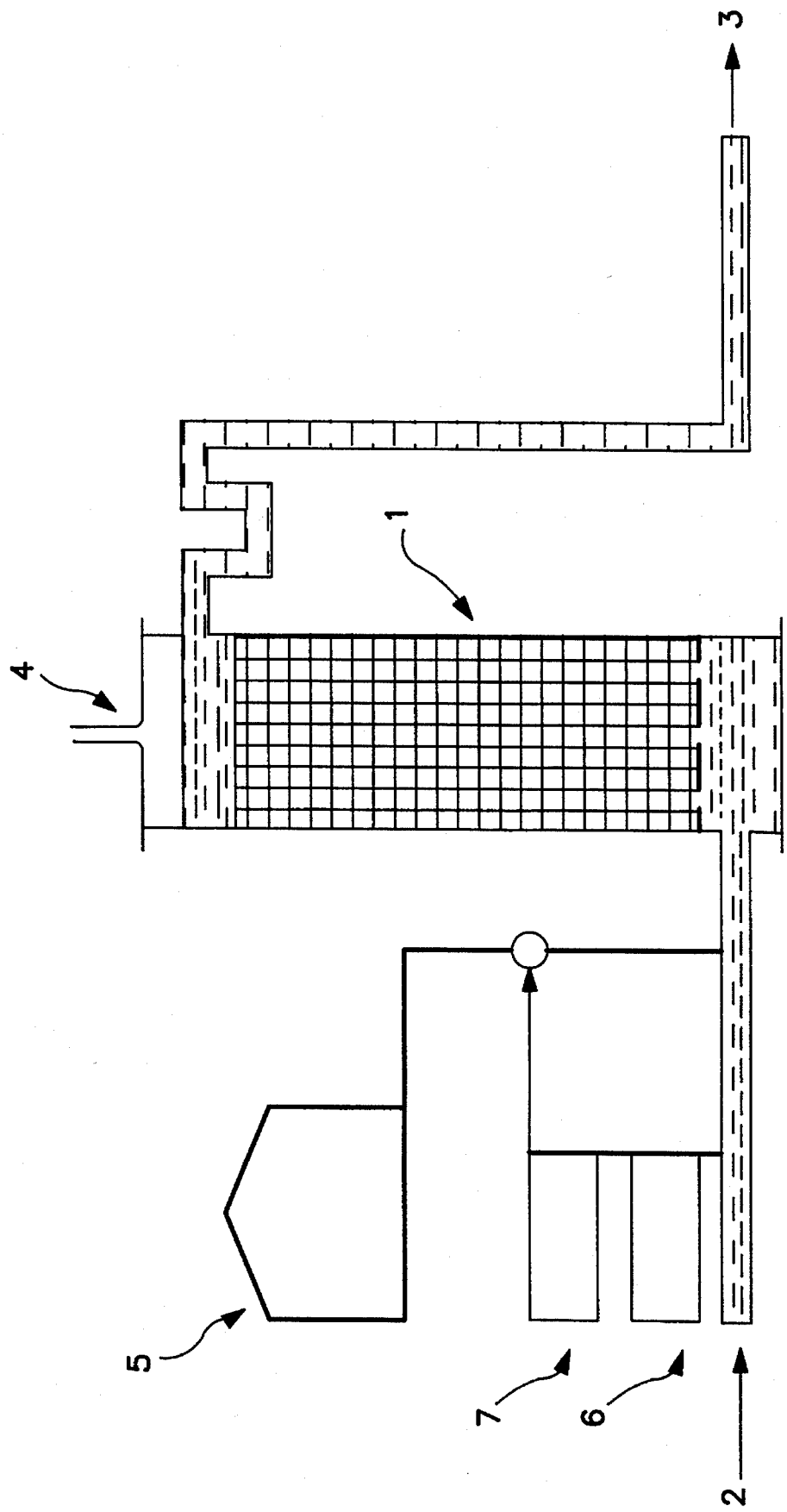
FIG. 1 shows a schematic sketch of the bioreactor. The symbols 1–7 represent the following.
Figure 2:
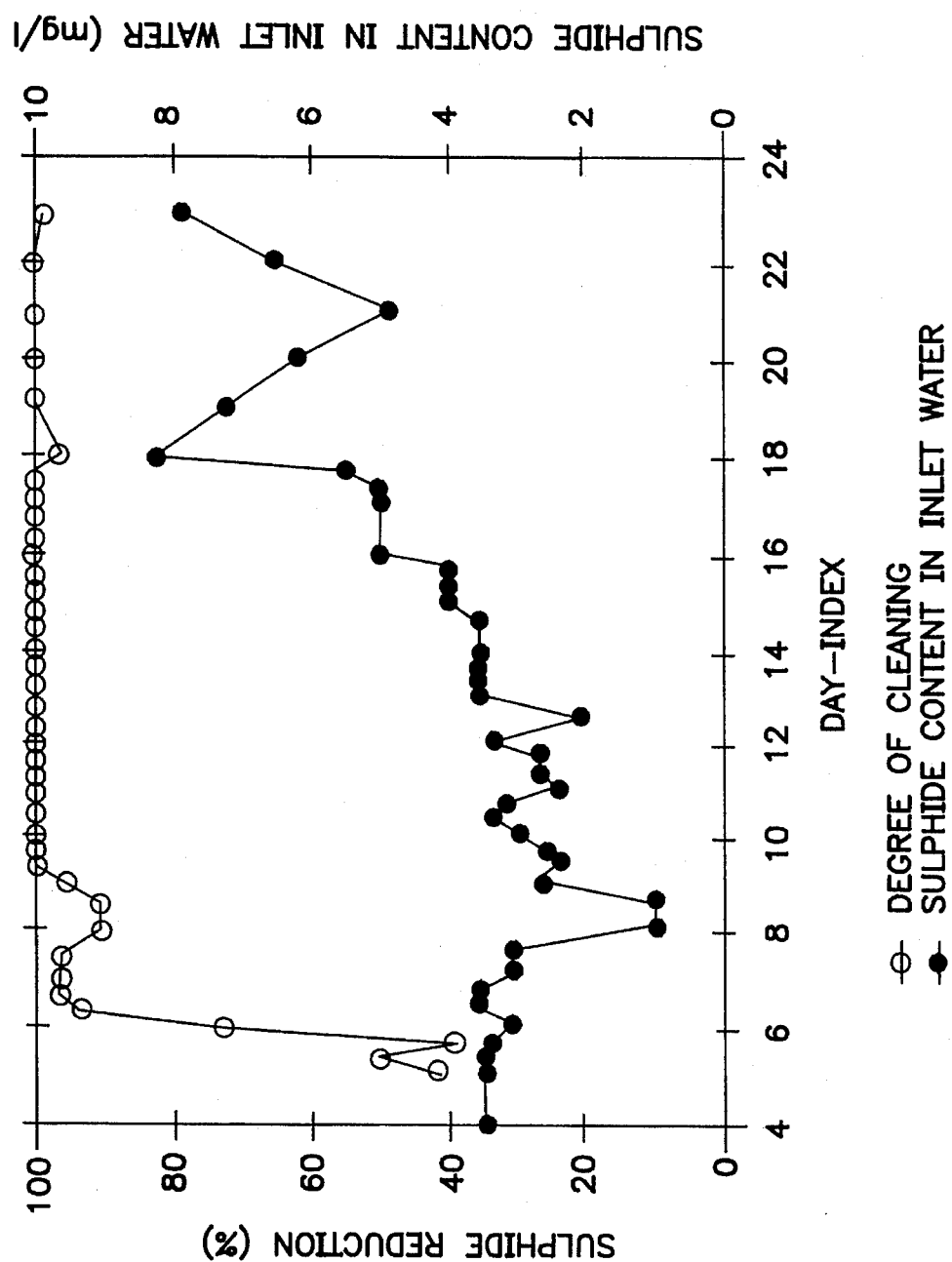

FIG. 2 shows oxidation of sulphide in the bioreactor when the sulphide content in the inlet water is quite low (0.5–8.5 mg/l).

Figure 3:
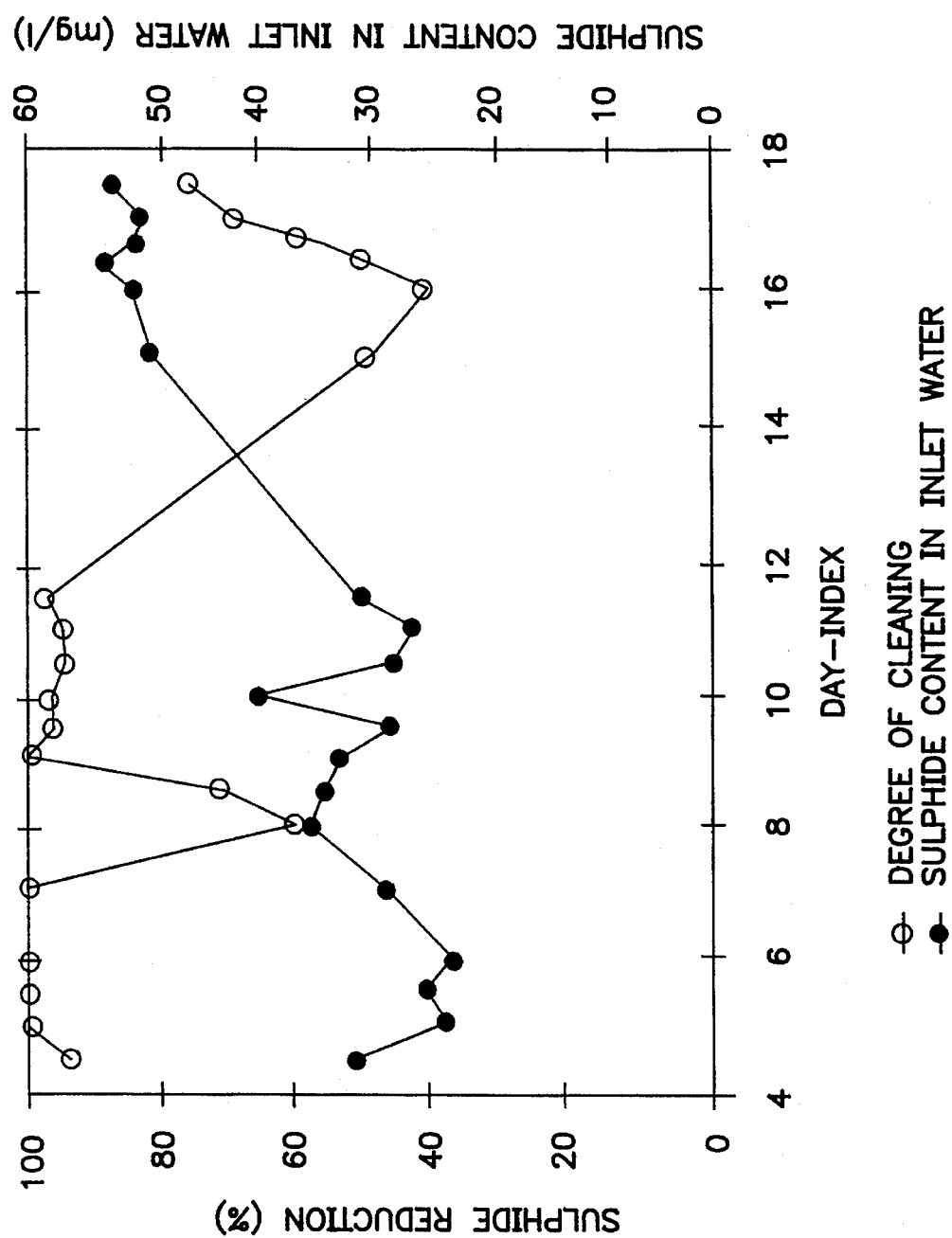

FIG. 3 shows oxidation of sulphide in the bioreactor when the sulphide content in the inlet water is rather high (20–55 mg/l).

DETAILED DESCRIPTION OF THE INVENTION

The present invention is unique in the way that it provides a bioreactor comprising an active biofilm having very large surface. The reactor tank is filled with a carrying material providing large contact area, and when oil-containing water and nitrate is evenly distributed over the carrying material which might already be covered with septic mud, an active sulphide oxidizing biofilm is formed. The biofilm comprises denitrifying bacteria. Because of the large surface covered by denitrifying bacteria a particularly effective sulphide oxidizing reactor is formed. This invention is therefore different form $H_2S$-reduction in sewage as described in for instance U.S. Pat. No. 4,911,843.

Certain denitrifying bacteria which are a dominant part of the biofilm, will oxidize already present $H_2S$. The chemical reaction describing this phenomenon is:

$$5\,S^{2-} + 8\,NO_3 + 8\,H^+ \rightarrow 5\,SO_4^{2-} + 4\,N_2 + 4\,H_2O.$$

To build up an active sulphide oxidizing biofilm on the carrying material in the reactor tank, inoculation of septic mud is used. Very often oil-containing water like ballast water, contains sufficient amounts of sulphide oxidizing bacteria to make a biofilm during a period of time. This makes it quite easy to maintain a stable biofilm. If destruction of the biomass should occur for some reason, regeneration will be quickly obtained as the oil-containing water contains some bacteria.

The retention time in the reactor tank needed to remove >90% of the hydrogen sulphide is surprisingly short compared to other biological reactions. This $H_2S$-reduction is achieved in 15–60 minutes. This short retention time is essential as it thereby will be possible to reduce the volume of the reactor tank considerably and with that also the investment costs.

There seems to be a connection between the carrying material in the reactor tank and the retention time. A carrying material providing large contact area, should when covered by an active biofilm represent a large and effective reaction zone to reduce hydrogen sulphide. Thus, the retention time should be short if the carrying material provides a large contact area which is covered by an active biofilm.

Raschig rings, Kaldnes rings and ceramic saddles like Novalox saddles and Berl saddles, which provide large contact area are therefore preferred carrying materials. The carrying material might be placed in removable baskets. In this way it is easy to keep control on the biofilm covering the carrying material during the performance of the process.

A further advantageous feature is that only minimal amounts of sludge will be formed in the reactor tank. Nitrate addition will be automatically controlled by analysis with regard to sulphide content in inlet water. Thus, low excess nitrate will not cause any trouble in the remaining parts of the cleaning plant.

Emission of gases like hydrogen sulphide and nitrous oxide is marginal when using the present invention.

pH will not be changed.

Using calcium nitrate represents a preferred feature of the invention. Calcium nitrate has high solubility in water, and is easy to handle. It does not give any dangerous reaction products, and does not require complicated dosing equipment.

Also other nitrates like sodium nitrate, potassium nitrate and nitric acid can be used as nitrate sources when performing the method according to the invention.

In the following the invention will be further explained by examples and attached figures.

All kinds of oil-containing water and water flows containing sulphide can be purified according to the present invention. The water is conducted through the bioreactor to remove the sulphide.

Anterior to the reactor tank 1, the oil-containing water is analyzed to control the presence of hydrogen sulphide. This analysis might be performed continuously, and the correct amount of nitrate needed may be calculated automatically by a computer. The dose ratio sulphide:nitrate, may be decided beforehand based on experiments, and the desired dose ratio is then put in to the computer calculating the nitrate requirement. When calculated, the correct amount of nitrate is added to the reactor tank 1, together with the oil-containing water.

The nitrate may also be added as a constant amount, but addition of the nitrate which is needed to reach a maximum of the $H_2S$-reduction will be preferred. This is because excess of nitrate might cause pollution on certain locations, and too small amounts of nitrate will cause low degree of $H_2S$-cleaning.

The reactor tank 1, is filled with a carrying material.

EXAMPLES

In these examples the carrying material was Raschig rings.

Building up the biofilm on the Raschig rings was done as follows:

1 l septic sludge was added pr. 10 l net reactor volume.

The retention time was 2.0 h for 3 days.

The dose ratio sulphide:nitrate was 1:15.

After 3 days an active biofilm was formed.

An experiment where the sulphide content in the inlet water was low (0.5–8.5 mg/l), was performed. The retention time was 15 minutes, and the dose ratio sulphide:nitrate, was 1:15. The degree of cleaning during this experiment was 100% as shown in FIG. 2.

Another experiment where the sulphide content in the inlet water was high (20–55 mg/l), was performed. The retention time was 15 minutes, and the dose ratio sulphide:nitrate, was 1:15. The degree of cleaning in this experiment was 100% when the sulphide content in inlet water was stable. However, when the sulphide content in the inlet water did change to a considerably higher level, there was a lag phase before an acceptable reduction of the sulphide content was re-established. This is shown in FIG. 3.

The present invention provides a method for effectively removing hydrogen sulphide from oil-containing water. When the sulphide content in the oil-containing water is quite constant, i.e. not varying more than 10 mg/l, the degree of cleaning is 100%. When larger variations in the sulphide content occur, there will be a lag phase before optimal sulphide reduction is restored.

The method does not form any toxic products.

The present invention further provides equipment for performing the above mentioned method, based on a bioreactor having large density of denitrifying bacteria which form a biofilm having a large surface.

We claim:

1. Method for removing hydrogen sulphide in oil-containing water, wherein sulphide-containing water and nitrate in a weight ratio of 1:10 to 1:40 (sulphide:nitrate), are supplied to a bioreactor comprising a reactor tank filled with a carrying material containing denitrifying bacteria, wherein the water and nitrate is evenly distributed over the carrying material and an active sulphide oxidising biofilm is formed, and where the retention time in the tank is 10–60 minutes.

2. Method according to claim 1, wherein the supply of nitrate is controlled by analysis with regard to sulphide content in the oil containing water.

3. Method according to claim 1, wherein the nitrate used is calcium nitrate.

* * * * *